Figure 1:
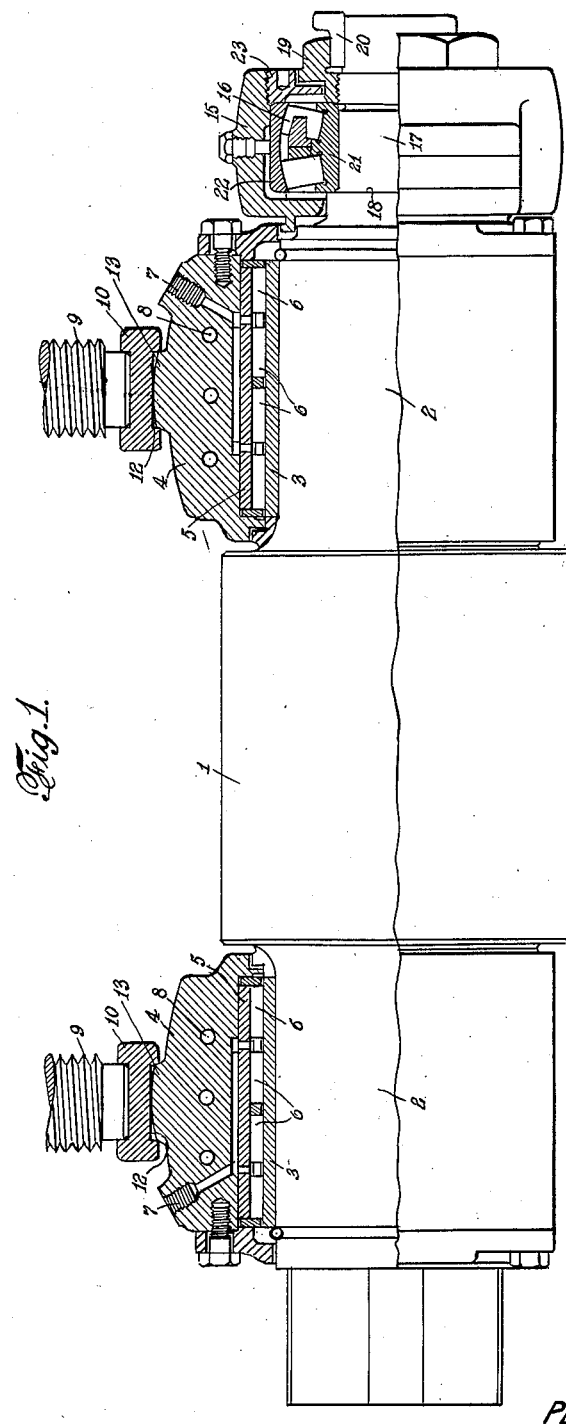

Dec. 12, 1939.  P. G. PALMGREN  2,182,994

BEARING FOR ROLLING MILLS AND THE LIKE

Filed April 18, 1934  2 Sheets-Sheet 1

INVENTOR
PER GUNNAR PALMGREN
BY
ATTORNEY

Dec. 12, 1939.   P. G. PALMGREN   2,182,994
BEARING FOR ROLLING MILLS AND THE LIKE
Filed April 18, 1934   2 Sheets-Sheet 2
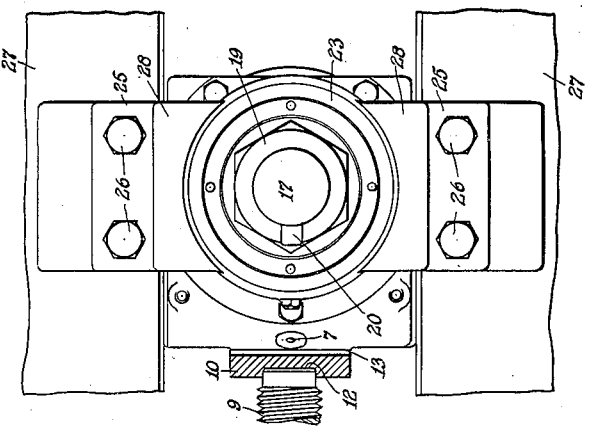
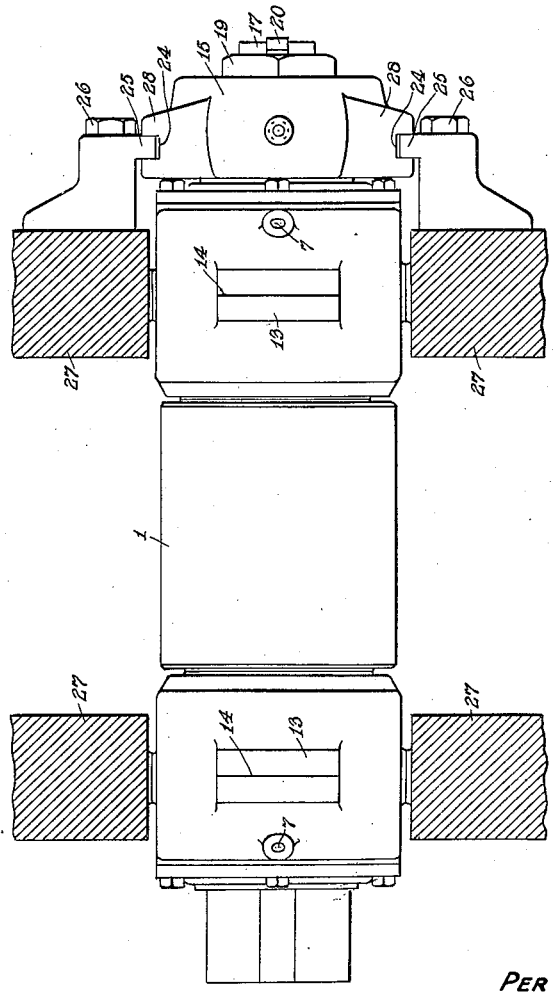
INVENTOR
PER GUNNAR PALMGREN
BY
ATTORNEY Patented Dec. 12, 1939

2,182,994

UNITED STATES PATENT OFFICE 2,182,994

BEARING FOR ROLLING MILLS AND THE LIKE

Per Gunnar Palmgren, Philadelphia, Pa., assignor to Aktiebolaget Svenska Kullagerfabrieken, Goteborg, Sweden, a corporation of Sweden Application April 18, 1934, Serial No. 721,141
In Germany April 24, 1933

4 Claims. (Cl. 80—55)

Rolling mill rolls are as a rule subjected to thrust forces in addition to radial loads. The thrust arises for instance when rolling between grooved rolls, or when the axes of the rolls are not quite parallel. Such thrust forces may also originate in the bearings themselves. Especially when the radial bearings consist of antifriction bearings having one or more rows of long rollers of small diameter, so called roller bushings, considerable thrust forces may be generated between the outer and inner ring in the same bearing if the rollers assume an oblique position. Tests have shown that these thrust forces cannot conveniently be taken up by guide flanges or pressure flanges at the ends of the roller or by annular bearing plates applied between the roll body and the bearing housing. A special antifriction bearing is consequently required for taking the thrust. If this thrust bearing is mounted in the same housing with the roller bushing for carrying the radial load, the housing must be fixed axially. The housing can be fixed through the adjusting screw in which case the axial pressure causes unfavourable bending forces, or at some other part of the bearing housing in which case bending forces are also generated.

These disadvantages are eliminated through the present invention which is characterized substantially thereby that the bearing taking up the axial pressure is mounted in a separate housing and that the bearing is movable along a guide in a direction substantially perpendicular to the axis of the roll.

One embodiment of my invention is illustrated in the accompanying drawings, in which Figure 1 is a side view partly in axial section of the upper part of a rolling mill showing the uppermost roll and associated parts. Figure 2 is a top view of the device illustrated in Figure 1, and Figure 3 is an end view of the device illustrated in Figure 2 looking at this from the left hand end.

On the roll neck 2 of the roll 1 are mounted bearings for taking up the radial load which bearings substantially consist of an inner ring 3 secured to the roll neck 2, an outer ring 5 located in the bearing housing or chuck 4 and two sets of long rollers 6 of small diameter. The bearings are of the rigid type termed roller bushings. Holes 7 are provided for introducing the lubricant and channels 8 for the cooling fluid. The bearing housing or chuck is located endwise by means of a pad or breaker plate 10 secured axially by the adjusting screw 9. These are for supporting or resisting the working load applied to the bearings to which they are subjected when rolling a work piece, and are frequently referred to in the art as screw-downs. The upper face of the pad is provided with a recess in which the adjusting screw engages and its under face has a recess 12 in which an elevation 13 on the bearing housing 5 enters since the upper portion only of the mill is illustrated in the drawings, it will be proper to say that in the drawings the member 13 is on the upper side of the bearing housing. To enable the chuck or bearing housing to be aligning the elevation 13 is relieved at its sides, thus forming a ridge 14 disposed in a substantially horizontal position and located at right angles to the roll for rockingly engaging the under face of the pad 10. The bearing housing can thus assume an oblique position when the roll bends under the rolling pressure.

The inner rings of the radial bearings are not provided with flanges, and consequently these bearings cannot withstand any thrust. The latter is instead taken up by a self-aligning roller bearing 16 mounted in a separate housing 15. The inner ring 21 of the roller bearing is mounted on the roll neck 17 and is held between a shoulder 18 and a nut 19 on the neck, secured by means of a key 20. The outer ring 22 of the bearing is fixed between one wall of the bearing housing 15 and a nut 23 screwed into the housing which together with the nut 19 forms a labyrinth seal. Through this arrangement the bearing housing 15 is fixed axially in relation to the roll. The housing is, however, free to swivel somewhat about the centre of the self-aligning bearing. The clearance between the bearing housing and the adjacent parts is ample enough to allow of the necessary swivelling of the bearing housing when the roll bends.

The bearing housing 15 is provided at each side with an ear 28. In each ear is a groove 24 in which a vertical guide 25 engages. The guide is fixed to the stand 27 by means of screws 26. By this arrangement the bearing housing 15, the bearing 16 and the roll 1 are fixed axially. When the roll neck assumes an oblique position the bearing housing can move vertically in the longitudinal guides the amount required by the displacement of the centre of the bearing 16 occasioned by the oblique position of the roll neck. The bearing housing 15 is always guided in a direction substantially perpendicular to the action of the roller by the guides 25 and it follows that when the roll neck assumes an oblique position there will be a relative swivelling movement between the roll neck and the housing 15, and at the same time an axial displacement between the different parts of the radial bearings. This relative swivelling movement is rendered possible through the self-aligning capacity of the bearing 16.

Other embodiments of the invention can be made. The bearing types and manners of mounting them may also vary. The bearing for taking the thrust may consist of a rigid bearing having spherical supporting surface. The arrangement may be such that the position of the bearing housing 15 is fixed in all directions, the bearing 16, however, being mounted in such a way that it can adjust itself radially in the housing.

I claim:

1. A bearing mounting, especially for rolling mills and the like, and comprising a frame and a roll mounted in the frame and formed with roll necks, a bearing housing surrounding each of said necks, there being radial bearings within the housing and supporting the roll necks of a type permitting axial adjustment of the roll necks, each bearing housing being formed with a substantially horizontal ridge located at right angles to the axis of the roll, means on the frame for engaging the ridges and supporting the loads to which the bearings are subjected when rolling a work piece, the roll being extended outwardly beyond one of the bearings and forming a bearing seat and a self aligning thrust bearing mounted upon the bearing seat, a separate housing supporting such bearing for taking up thrust, the housing being provided with guide ways substantially perpendicular to the axis of the roll, and guiding members freely movable in said guides and secured to the frame whereby the thrust bearing is movable in a direction substantially perpendicular to the axis of the roll, the said means for supporting the load permitting the movement of the said outward extension in the general plane of the said guideways.

2. A bearing mounting, especially for rolling mills and the like, having a roll provided with necks mounted in a frame, a bearing housing surrounding each of the said necks there being radial bearings within the housings and supporting the roll necks, of a type permitting axial adjustment of the roll necks, each bearing housing being formed with a substantially horizontal ridge located at right angles to the axis of the roll, means on the frame for engaging the ridges for supporting the loads to which the bearings are subjected when rolling a work piece, the roll being extended outwardly beyond one of the bearings and forming a bearing seat and a self-aligning thrust bearing mounted upon the bearing seat, a separate housing supporting such bearing for taking up thrust, the housing being provided with guide ways substantially perpendicular to the axis of the roll, and guiding members freely movable in said guides and secured to the frame whereby the thrust bearing is movable in a direction substantially perpendicular to the axis of the roll, the said means for supporting the load permitting the movement of the said outward extension in the general plane of the said guideways.

3. A bearing mounting, especially for rolling mills and the like, having a roll mounted in a frame and formed with roll necks, a bearing housing surrounding each of said necks, there being radial bearings within the housings and supporting the roll necks of a type permitting axial adjustment of the roll necks, each bearing housing being formed with a substantially horizontal ridge located at right angles to the axis of the roll, means on the frame for engaging the ridges for supporting the loads to which the bearings are subjected when rolling a work piece, the roll being extended outwardly beyond one of the bearings and forming a bearing seat and a self aligning thrust bearing mounted upon the bearing seat, a separate housing supporting such bearing for taking up thrust, the housing being provided with guideways substantially perpendicular to the axis of the roll, and guiding members freely movable on said guideways and secured to the frame whereby the thrust bearing is movable in a direction substantially perpendicular to the axis of the roll but prevents axial movement of said roll due to end thrust, the said means for supporting the load permitting movement of the said outward extension of the roll in the general plane of the said guideways.

4. A bearing mounting, especially for rolling mills and the like, and comprising a frame and a roll mounted in the frame and formed with roll necks, a bearing housing surrounding each of said necks, there being radial bearings within the housings and supporting the roll necks of a type permitting axial adjustment of the roll necks, means for tiltably supporting the bearing housing in the frame, the roll being extended outwardly beyond one of the bearings and forming a bearing seat, and a self-aligning thrust bearing mounted upon the bearing seat, a separate housing supporting such bearing for taking up thrust, the housing being provided with guideways substantially perpendicular to the axis of the roll, and guiding members freely movable in said guides and secured to the frame whereby the thrust bearing is movable in a direction substantially perpendicular to the axis of the roll, and means for receiving pressure from the radial bearing for permitting movement of the said outward extension of the roll in the general plane of the said guideways.

PER GUNNAR PALMGREN.